3,378,333
WATER ACTIVATED VAPORIZER
Alan D. Brite, 5147 W. Jefferson Blvd.,
Los Angeles, Calif. 90016
Continuation-in-part of application Ser. No. 441,659,
Mar. 22, 1965. This application Aug. 10, 1966, Ser.
No. 571,499
12 Claims. (Cl. 21—110)

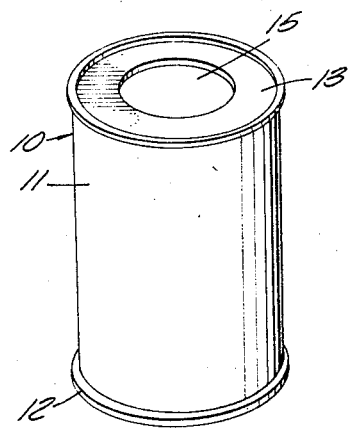
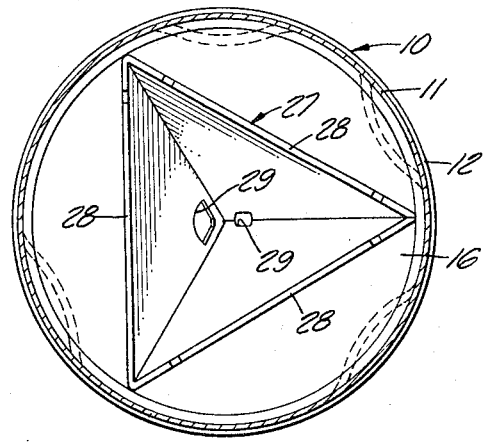
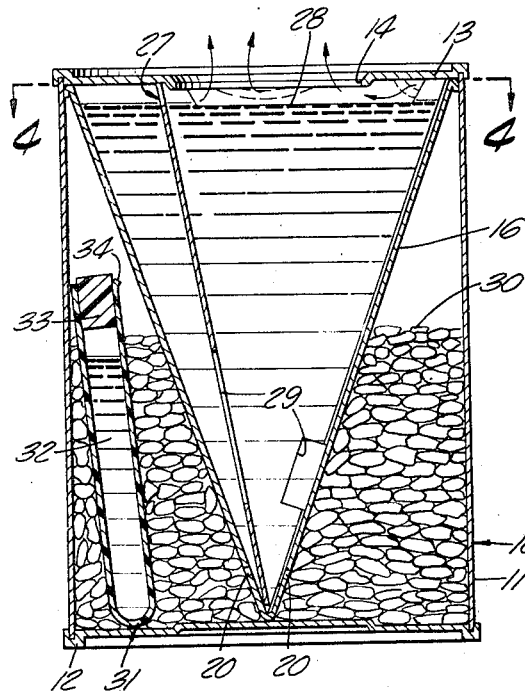
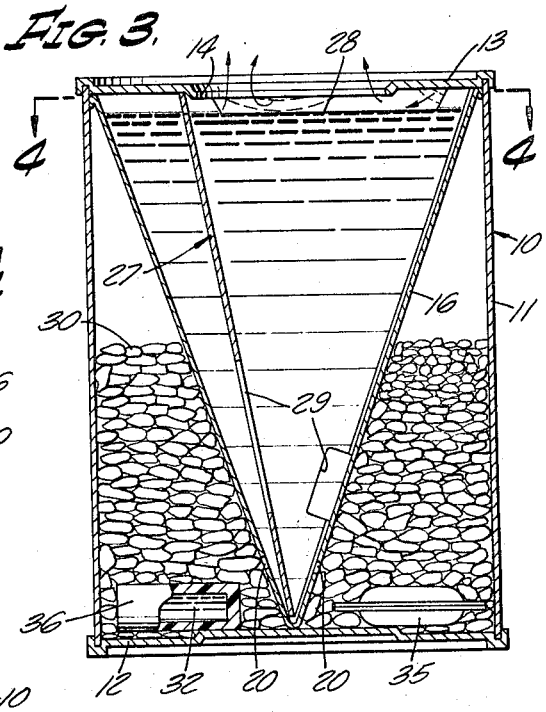
INVENTOR.
ALAN D. BRITE
BY Lyon & Lyon
ATTORNEYS

United States Patent Office 3,378,333
Patented Apr. 16, 1968

ABSTRACT OF THE DISCLOSURE

A self-contained and disposable article for producing steam and vapor of a desired vaporizable material, wherein alkaline earth oxide is provided in a container to which water is added for producing an exothermic reaction to produce the steam and vapor, and wherein the vaporizable material may be incompatible with the alkaline earth oxide. The vaporizable material is contained in a capsule which is impervious to the alkaline earth oxide and the vaporizable material, but serves to release the vaporizable material upon occurrence of the exothermic reaction.

---

This is a continuation-in-part of my copending application, Ser. No. 441,659, filed Mar. 22, 1965 entitled Vapor-Producing Composition and Article. The present invention relates to a self-contained means for the production of vapors through an exothermic reaction to virtually fill an enclosed area with a vaporizable material or materials and, in particular is directed to such an arrangement wherein the vaporizable materials are incompatible with the substance producing the exothermic reaction causing vaporization.

Various devices have heretofore been proposed and used for generating and dispensing vapors of a selected material for accomplishing a particular purpose depending on the type of vaporizable material. One such device is disclosed in my aforementioned application describing primarily the advantages of vaporizing an inhalant material for the relief of bronchial congestion and other symptoms of the common cold. The device of my aforementioned patent application employs a water activated substance such as lime for producing an exothermic reaction to vaporize the medicant or other material which had previously been coated on the lime. Other conventional vaporizing devices for various purposes employ either a container and heating element for boiling water and thereby vaporizing the vaporizable material or a pressurized spray arrangement for creating a fine mist which vaporizes to permeate the enclosed area. Electrically heated vaporizers are notoriously inefficient, slow-acting, inconvenient and sometimes dangerous. Mist producing spray devices are somewhat effective for some materials but require greater effort and attention to accomplish complete coverage of the entire closed area than heated type vaporizers. This is due to the fact that heated vapors naturally tend to first rise and then settle in a room thereby obtaining more complete coverage.

While the device of my aforementioned patent application has been found to be extremely successful in producing and dispensing vapors of a vaporizable material by creating a fog which permeates the enclosed area, certain limitations as to the materials which may be used in the manner therein disclosed have been discovered. The vaporizable material or materials must be compatible with the lime or other alkaline earth oxides employed over extended periods of time since the lime is coated with the vaporizable material before packaging the product. Obviously it is undesirable for any deterioration to occur to the lime due to the vaporizable material or conversely to the vaporizable material due to the lime before the vaporizer is ready to be used. This unduly restricts the materials which might be advantageously used in my device. In particular it has been found that most insecticides are incompatible with lime and therefore cannot be packaged in the manner described in my aforementioned patent application. This is in spite of the fact that the vapor generating and dispensing characteristics of my device would be extremely useful in dispensing insecticides for accomplishing a complete and thorough fumigation of a particular enclosed area. Many available insecticides function best if dispensed in a closed and uninhabited room which is left closed and uninhabited for a period of time such as overnight. However justifiable caution dictates that it is unwise to leave an electrically heated vaporizer unattended for such a period of time or for a person to remain within the room a sufficient duration to accomplish the spraying of all the nooks and crannies with an aerosol type insecticide sprayer. Thus effective fumigation can usually be accomplished only by professionals with proper and expensive equipment.

Accordingly a principal object of this invention is to provide a novel form of water-activated vaporizer in which the vaporizable material is appropriately protected from the water-activated substance which produces the exothermic reaction and yet such reaction vaporizes both the water and the vaporizable material to produce a permeating fog.

Another object of this invention is to provide a novel form of self-contained vaporizer which is activated simply by adding water in which the active materials are not compatible with one another for extended periods of time and means are provided for keeping such incompatible materials separated until the addition of water. A further object of this invention is to provide such an arrangement wherein the vaporizable material is completely incompatible with the exothermic reaction producing material and is contained in an impermeable vial for vaporizing due solely to the heating of the vial. Another object of this invention is to provide such a self-contained water activated vaporizer in which the vaporizable material is contained in a pouch or the like buried among an exothermic reaction-producing substance and which pouch is opened or disintegrated by the heat to liberate the vaporizable material into intimate contact with the substance for vaporizing.

Other and more detailed objects and advantages of this invention will appear from the following description and the accompanying drawings, wherein:

FIGURE 1 is a perspective view of a preferred form of the self-contained vaporizer of the present invention.

FIGURE 2 is a vertical sectional view taken through the center of the vaporizer shown in FIGURE 1.

FIGURE 3 is a view similar to FIGURE 2 and illustrating modified embodiments of the vaporizable material containing capsules that may be employed in the present invention.

FIGURE 4 is a sectional plan view taken substantially on the line 4—4 of FIGURE 2 or at a like location on FIGURE 3.

Briefly, this invention comprehends within its scope the discovery that lime (calcium oxide) or other alkaline earth oxides can be used as a vapor-generating medium in a self-contained vaporizer with a vaporizable material which is incompatible with the vapor-generating medium by retaining the vaporizable material in a container which opens upon activation of the vaporizer. Thus the invention includes a container in which a quantity of alkaline earth oxide is contained, means for producing a controlled rate of reaction upon the addition of water, and a vaporizable material contained within a capsule positioned within the alkaline earth oxide and automatically opened by the heat of reaction of the water and alkaline earth oxide. The vaporizable material may be of any appropriate type for accomplishing the particular objectives desired for the vaporizer.

Referring now to the drawings, a preferred form of the vaporizer of the present invention, generally designated 10, includes a generally cylindrical container 11 which may be of metal or formed of resin-impregnated carboard having a metal bottom 12 and top 13. The top 13 is provided with a central opening 14 having a removable closure 15. The closure 15 is preferably of the breakaway type which cannot be refitted on the top 13 since this would create a dangerous condition if done following the addition of water. Positioned within the container 11 is a cone-shaped cup member 16 formed of resin-impregnated paper or other material suitably treated to render it resistant to water at least temporarily. The cup member 16 is open at the top and is provided with one or more relatively small openings 20 adjacent the bottom or apex of the cup member. The size and number of openings 20 will depend on the particular alkaline earth oxide employed and whether such oxide has been treated to slow its rate of reaction. The top of the cup member 16 is positioned just under the container top 13 while the apex of the cup member rests on the container bottom 12. The cup member 16 is structurally supported from the inside by any convenient means such as stiffeners or ribs 27 of cardboard or the like forming a pyramid shaped support structure. The top edges 28 of the stiffener ribs 27 are spaced a short distance from the upper edge of the cup member and therefore are below the container top 13. One or more openings 29 of any convenient shape are provided in the ribs 27 for the free passage of water from within the pyramid formed by ribs 27 into the cup member 16.

The substance 30 for producing the exothermic reaction upon the addition of water is contained in the volumetric space of the container 11 between the outer surface of the cup member 16 and the inner surfaces of the container's cylindrical side wall and the bottom. As shown, it is preferred that the substance 30 occupy less than the entire volumetric space. The substance 30 may be of any convenient alkaline earth oxide for producing the exothermic reaction as for example lime (calcium oxide). The lime substance 30 may be treated such as by coating with an oily or wax material for slowing the rate of reaction as is disclosed in my aforementioned application Ser. No. 441,657. In the alternative the lime substance 30 may be untreated and the rate of reaction controlled solely by the rate at which the water is added to the lime by passing through the small openings 20. As thus far described the device of this invention is the same as is disclosed in my aforementioned application Ser. No. 441,657 except that such application specifically contemplates and requires that the lime always be coated in accordance with that invention. Such lime coating includes the vaporizable material desired to produce the particular beneficial results and in that respect the coating serves the dual function of comprising the reaction inhibitor and the vaporizable material. Further, as thus far described, the alternate embodiments of this invention shown in FIGURES 2 and 3 are identical.

This invention contemplates the use of a vaporizable material which cannot be used as a coating for the lime or even left in contact with the lime for extended periods of time due to the incompatibility of the two substances. Means are provided for isolating the vaporizable material from the lime until the exothermic reaction begins and, referring more particularly to FIGURE 2, these means may include a capsule or vial 31 of an impervious and heat resistant material such as glass. The vial 31 is positioned in the volumetric space between the cup member 16 and the container 11 along with the lime substance 30. The vaporizable material 32 is contained within the vial 31 and obviously may be of any composition since it is isolated from the lime 30. The upper end of vial 31 is closed with a fusible material 33 such as wax which will melt due to the elevated temperature caused by the initial heat of reaction of the water contacting the lime 30 to thereby open the vial 31. The continuing exothermic reaction of water and lime will cause vaporization of the vaporizable material 32 and the resultant vapors will be carried off with the steam produced by the lime-water reaction. The vial 31 may either be secured to the inside of container 11 to maintain its upper end 34 above the uppermost level of lime 30 or the vial may be of sufficient length, as shown that it is prevented from assuming any other position.

Referring now more particularly to FIGURE 3, two additional forms of capsules are shown for containing and isolating the vaporizable material from the lime 30. Either capsule functions in the same manner but one may be more appropriate for a particular vaporizable material than the other and, in fact, where two different vaporizable materials are to be provided in a single vaporizer 10 the arrangement may be precisely as shown in FIGURE 3 where two different capsules are employed. This also contemplates the use of a vial 31 with either of the capsules illustrated in FIGURE 3 or any other type of capsule. One of the capsules is in the form of a pouch 35 formed of any convenient sheet material such as metal foil or plastic or laminates of both. The material of pouch 35 is such as to contain the vaporizable material 32 and resist deterioration by either the material 32 or the lime 30. Further the material of pouch 35 must be destructable, at least in part, by the heat produced upon the addition of water to the lime 30 thereby liberating the vaporizable material into intimate contact with the water and lime for vaporization. With this arrangement the vaporizable material must not be susceptible to rapid deterioration or destruction by contact with the lime. Similarly, the vaporizable material may be contained in a hollow capsule 36 of cast material such as wax or the like when such is a more convenient or proper container for the particular vaporizable material 32. The wax capsule 36 of course melts upon occurrence of the exothermic reaction of water and lime thereby liberating the vaporizable material 32 to be vaporized the same as the liberation of the material from pouch 35. Again the material 32 used in a capsule 36 must be capable of intimate contact with the lime 30 for a short duration without destruction or detrimental deterioration.

As an example of an embodiment of this invention without limiting this invention to the details of such embodiment, a successful insecticide vaporizer is formed by using a container of a shape and description of container 11 appropriately filled with 250 grams of lime and the provision of one-quarter fluid ounce of pyrethrins in a plastic pouch 35. Other types of insecticides which may be used in the embodiments of this invention are dieldrin, DDT, malathion, lindane and pyrethrins combined with piperonyl butoxide. Of course any other type of insecticide susceptible of vaporizing upon the application of heat may be used. The quantity of lime may be varied as desired for accomplishing a complete vaporization of the amount of insecticide used. Moreover it is to be understood that this invention is not limited to the use of insecticides but rather any vaporizable material may be used in this arrangement for producing a particular function and the invention is particularly applicable to vaporizable materials which cannot be mixed directly with lime or other alkaline earth oxides for any extended period of time.

In using the vaporizer 10, the closure 15 is removed and water, preferably hot, is poured into the cup member 16 to approximately the level indicated in FIGURES 2 and 3. The water slowly passes through the openings 20 and comes into contact with the substance 30, moving progressively upwardly through the particles at a rate determined by the size of holes 20. If the lime substance 30 is uncoated then the exothermic reaction occurs immediately whereas if the lime is coated or otherwise treated a short period of time will be required for the water to penetrate the coating or treatment. The exothermic reaction heats the entire container and produces steam thereby liberating the vaporizable material 32 from the particular type of capsule (vial 31 or pouch 35 or capsule 36) which is provided in the particular vaporizer. The exothermic reaction continues and the heat causes the vaporizable material to be released and carried off with the steam. The steam tends to soften the upper portions of the cup member 16 and the pressure and softening causes the cup member to collapse inwardly at random locations as shown by the phantom lines in FIGURES 2, 3 and 4. The mixture of steam and the vapor from the material 32 rise out of the container opening 14 as indicated by the arrows and thence permeate the entire enclosed area. In a typical embodiment such as that described specifically above and by adding about 12 fluid ounces of water, clouds of steam and vapor are produced and fill a normal size room to permeate all reaches. The reaction is delayed a few moments if the lime is coated or, if uncoated, will start slowly due to the slow addition of the water to the lime thereby giving ample time for the person adding the water to leave the room, particularly in the case of an insecticide material 32 which might be detrimental to the health.

It will be understood that the particular vaporizer container used with this invention may take many forms although the container illustrated is preferred. It will be further understood that various proportions of alkaline earth oxide and vaporizable material may be used although it is obviously preferred that a sufficient quantity of alkaline earth oxide be present to react with the water and form sufficient steam and heat to vaporize at least a substantial proportion of the vaporizable material contained in the capsule. As previously mentioned the vaporizable material may be of any type such as but not limited to inhalants, medicants, disinfectants, cosmetic materials, deodorants, insecticides, desirable fragrants, etc. and due to the arrangement provide such vaporizable material need not be completely inert or non-reactive with alkaline earth oxides.

Having fully described my invention in connection with a particular embodiment which is preferred, it is to be understood that my invention is not limited to the details herein set forth or to the details illustrated in the drawing but rather is of the full scope of the appended claims.

I claim:

1. A water-activated vaporizer comprising a container having a releasable top opening for adding water, a quantity of alkaline earth oxide in said container, means for slowly exposing the alkaline earth oxide to the water added to produce a controlled exothermic reaction, a capsule positioned in said alkaline earth oxide and having at least a portion thereof fusible by the heat of the exothermic reaction to open said capsule, and a vaporizable material sealed within said capsule and liberated by the said opening of capsule for vaporizing and dispersing with stream from the exothermic reaction, said capsule being impervious to water and to said vaporizable material and to said alkaline earth oxide.

2. The vaporizer of claim 1 in which said vaporizable material is not compatible with the said alkaline earth oxide for extended periods of time.

3. The vaporizer of claim 1 in which said vaporizable material is in an insecticide.

4. The vaporizer of claim 3 in which said vaporizable material is selected from the group consisting of pyrethrins, pyrethrins combined with piperonyl butoxide, dieldrin, DDT, malathion, lindane and mixtures thereof.

5. The vaporizer of claim 1 in which said vaporizable material contains a medicant inhalant material.

6. The vaporizer of claim 1 in which said capsule is comprised of a vial capable of withstanding the heat of the exothermic reaction, said vial is positioned in said container with one end above the alkaline earth oxide, and said fusible portion comprises a meltable plug sealing said one end of the vial.

7. The vaporizer of claim 6 in which said vaporizable material is completely incompatible with said alkaline earth oxide for even short periods of time and is vaporized by the heating of the vial without contacting the alkaline earth oxide.

8. The vaporizer of claim 1 in which said capsule is comprised of a pouch of sheet material which is destroyed by the heat of the exothermic reaction to liberate said vaporizable material.

9. The vaporizer of claim 8 in which said sheet material is laminated metal foil and plastic.

10. The vaporizer of claim 1 in which said capsule is formed entirely of a meltable material.

11. A self-contained and water activated vaporizer comprising a disposable container having a removable top closure through which the water is added, a baffle means in said container for temporarily retaining the water, alkaline earth oxides partially filling said container on the opposite side of said baffle means from where the water is added, small openings in said baffle means for slowly adding the water to the alkaline earth oxide to produce a controlled exothermic reaction producing steam, and a quantity of vaporizable material provided in said container, means unaffected by the vaporizable material and water and the alkaline earth oxide isolating said vaporizable material from said alkaline earth oxide and including means responsive to the exothermic reaction to release said vaporizable material, said vaporizable material being exposed to the heat of said exothermic reaction for vaporizing said material and dispensing such vapors with the steam from the container.

12. The vaporizer of claim 11 in which said means for isolating the vaporizable material is a capsule containing the vaporizable material and said capsule has at least a portion which is opened upon the addition of water to the alkaline earth oxide for allowing the vaporizing of said vaporizable material.

References Cited

UNITED STATES PATENTS

| | | | |
|---|---|---|---|
| 827,222 | 7/1906 | Espenhayn et al. | 126—263 |
| 1,497,970 | 6/1924 | Berkey | 126—263 |
| 2,497,612 | 2/1950 | Katzman | 126—263 X |
| 3,175,558 | 3/1965 | Caillouette et al. | 126—263 X |

CHARLES J. MYHRE, *Primary Examiner.*